United States Patent [19]
Hayden et al.

[11] Patent Number: 5,494,869
[45] Date of Patent: Feb. 27, 1996

[54] PROCESS FOR REGENERATING NITROGEN-TREATED CARBONACEOUS CHARS USED FOR HYDROGEN SULFIDE REMOVAL

[75] Inventors: Richard Hayden, Pittsburgh; Steven L. Butterworth, Bethel Park, both of Pa.

[73] Assignee: Calgon Carbon Corporation, Pittsburgh, Pa.

[21] Appl. No.: 219,625

[22] Filed: Mar. 29, 1994

[51] Int. Cl.$^6$ .................................................. B01J 38/48
[52] U.S. Cl. ............................ 502/22; 502/517; 423/230; 423/523
[58] Field of Search ............................... 502/22, 25, 26, 502/27, 28, 55; 95/136; 423/230

[56] References Cited

U.S. PATENT DOCUMENTS 4,259,301   3/1981  Say ............................................. 95/136
4,810,266   3/1989  Zinnen et al. ........................... 502/437

*Primary Examiner*—Anthony McFarlane
*Attorney, Agent, or Firm*—Titus & McConomy

[57] ABSTRACT

A process is provided for the restoration of hydrogen sulfide removal capacity in nitrogen-treated carbonaceous chars which have become exhausted for hydrogen sulfide capacity when used for the removal of hydrogen sulfide from gas streams containing oxygen and water. This process entails washing the spent carbonaceous char with water of sufficient quantity to remove the majority of the hydrogen sulfide reaction products. By the use of this process a significant proportion of the original hydrogen sulfide capacity of the nitrogen-treated carbonaceous char is recovered.

9 Claims, No Drawings

PROCESS FOR REGENERATING NITROGEN-TREATED CARBONACEOUS CHARS USED FOR HYDROGEN SULFIDE REMOVAL

FIELD OF THE INVENTION

The present invention relates to a method for restoring the hydrogen sulfide removal capacity of spent nitrogen-treated carbons used for the removal of hydrogen sulfide from gas streams containing oxygen and water.

BACKGROUND OF THE INVENTION

Various methods are known for imparting catalytic activity to carbonaceous chars by treatment of such chars with nitrogen-containing compounds. In some cases a high-temperature char such as charcoal or activated carbon is heated at temperatures above 700° C. in the presence of a nitrogen-containing compound such as ammonia or an amine. In other treatment processes activation of the char with steam and exposure to the nitrogen-containing compound occur simultaneously. Other variations of the process involve incorporating the nitrogen-containing compound directly into the raw material used to produce the char. In another method, the nitrogen-containing compound is introduced after low-temperature carbonization and oxidation of a nitrogen-poor char feedstock but before high temperature exposure and condensation of the carbon structure. This method produces the highest functional utility with the least economic and environmental costs. For the purposes of the following discussion, all catalytic carbons produced by such processes will be hereinafter referred to as "nitrogen-treated carbons."

Nitrogen-treated carbons have the ability to function as catalysts per se without the addition of metal impregnants. They have utility in a number of applications, particularly hydrogen sulfide removal from gas streams containing oxygen and water vapor. However, during use, the carbon catalysts prepared by such processes become spent or deactivated, requiring the carbon catalyst to be replaced with a fresh supply of catalyst material. Currently, no methods exist for the regeneration of nitrogen-treated carbons used for hydrogen sulfide removal from gas streams containing oxygen and water. Moreover, it is not known how the chemistry of hydrogen sulfide removal occurs on nitrogen-treated carbons or how this chemistry may affect the catalyst sites created by the nitrogen treatment.

It is known that conventionally activated carbons and activated carbons impregnated with salts such as caustic soda or caustic potash remove hydrogen sulfide from gas streams containing oxygen and water by oxidation of the hydrogen sulfide to elemental sulfur, i.e., $$2H_2S + O_2 \rightarrow 2S + 2H_2O \qquad (1).$$

Small amounts of sulfuric acid have also been observed as a reaction product in certain cases; however, this phenomenon is considered to be a minor and unwanted side reaction the origins of which have been generally attributed to the presence of iron or other ash impurities. The elemental sulfur created by reaction (1) deposits in the pore structure of the carbon until the operative moiety responsible for the catalysis is occluded.

Methods for regenerating conventional activated carbons deactivated in this manner have relied upon solvents or upon thermal treatments to remove the accumulated elemental sulfur. The solvents used in such methods are invariably hazardous, expensive, or inconvenient to use. Carbon disulfide, the solvent of choice in many applications, is highly volatile and flammable as well as expensive and highly toxic. Water, the cheapest, safest, and most convenient solvent, cannot be used for regeneration since elemental sulfur is insoluble in water.

Thermal techniques may also be used to restore hydrogen sulfide capacity in conventional carbons deactivated by exposure to hydrogen sulfide. Elemental sulfur sublimes at temperatures above 445° C. and may, therefore, be removed from the carbon surface by direct heating or by hot gases such as nitrogen or steam. Where steam or other oxidizing or reducing agents are present, various other sulfur compounds will also be produced. Since these methods generate significant quantities of sulfurous vapors, post-treatment facilities such as acid scrubbers or Claus plants are generally required. Additionally, these methods are energy intensive and require materials of construction which must withstand both high temperatures and corrosive gases. As a result, the utility of thermal treatment methods is limited.

The caustic-impregnated carbons are usually regenerated by contact with concentrated caustic solutions in which elemental sulfur is highly soluble. Since concentrated solutions of sodium or potassium hydroxide are corrosive and toxic, these methods are also hazardous, expensive, and inconvenient to use. Thermal treatment methods are generally not a suitable option for caustic-impregnated carbons since the impregnant catalyzes gasification of the carbon structure at high temperatures and creates aerosols which corrode common materials of construction. Where transition metals are used to impregnate the carbons, comparable problems are encountered. Furthermore, the use of an oxidizing agent is generally required to restore the functioning of transition metal-impregnated carbon catalyst. Such treatments also create significant amounts of sulfurous off-gases which require extensive post-treatment.

Accordingly, it is the object of the present invention to provide a method for regenerating with water a spent nitrogen-treated carbon used for hydrogen sulfide removal.

SUMMARY OF THE INVENTION

Surprisingly, it has been found in the present invention that nitrogen-treated carbons used for hydrogen sulfide removal from gas streams containing oxygen and water can be regenerated by washing the spent carbon with water. This is contrary to the teachings of prior art where hydrogen sulfide reacts on the carbon to form primarily elemental sulfur which is not soluble in water. Pursuant to the present invention, it has been discovered that nitrogen treatment of the carbon greatly enhances the conversion hydrogen sulfide to sulfuric acid rather than to elemental sulfur. The overall reaction may be represented by $$H_2S + 2O_2 \rightarrow H_2SO_4 \qquad (2)$$

This reaction chemistry is different from that of prior art.

The nature of the catalyst site responsible for reaction (2) is not known. However, comparison of the removal chemistries of a nitrogen-treated carbon to a conventional carbon prepared from the same raw material, and with comparable adsorption properties and comparable levels of ash and iron, shows that it is the nitrogen treatment which confers the increased activity of reaction (2) to the carbon. It has been found in the present invention that neither hydrogen sulfide nor sulfuric acid react with the catalysts sites, despite the well-known ability of sulfur compounds to poison conventional catalysts. It has also been found that substantial amounts of the acid can be removed from the carbon surface despite the ability of sulfuric acid, typically, to be strongly adsorbed by the carbon surface.

In a preferred embodiment of the invention the spent carbon is washed with water in either a continuous or batch process until the pH of the effluent water is 6 or above. This water-washing regenerates the hydrogen sulfide removal capacity of the nitrogen-treated carbon. The water-washed carbon may then be dried as desired. Upon re-exposure to hydrogen sulfide in the presence of oxygen and water vapor, the carbon is again effective for hydrogen sulfide removal. The cycle of exposure and regeneration in this manner may be repeated as many times as desired, or until the recovered hydrogen sulfide capacity provides a level of performance that is not practical.

Thus, the present invention provides a highly effective and cost efficient process for the restoration of hydrogen sulfide removal capacity in spent nitrogen-treated carbonaceous chars which are selective for hydrogen sulfide conversion to sulfuric acid. Other advantages of the present invention will become apparent from a perusal of the following detailed description of the presently preferred embodiment of the invention.

PRESENTLY PREFERRED EMBODIMENT

The following examples provide a detailed representation of a presently preferred embodiment of the invention. Example 1 illustrates the selectivity for sulfuric acid conversion and the greatly improved hydrogen sulfide removal capacity conferred by the nitrogen treatment when compared to a carbon comparable in every other relevant aspect except the nitrogen treatment. Example 2 illustrates the efficacy of water-washing in restoring hydrogen sulfide removal capacity to the spent nitrogen-treated carbon.

Example 1

A sample of a nitrogen-treated carbon was prepared in the following manner: Bituminous coal was pulverized, mixed with about 4 to 6% coal tar pitch, and briquetted. The resultant briquettes were crushed and sized to produce an approximately less than 4 mesh and greater than 10 mesh (U.S. Standard Series sieves) material. In the presence of large quantities of excess air, this material was carbonized and oxidized at temperatures between about 250° C. and 450° C. for at least 3 hours. The resultant oxidized char was cooled to near ambient temperatures and subsequently impregnated with an aqueous urea solution and dried. The quantity of urea solution used was sufficient to produce a 2–4% urea loading on a dry weight basis. The impregnated, oxidized char was then heated to about 950° C. in a furnace and maintained at that temperature for up to 1 hour. Immediately following this treatment the material was contacted with steam, while maintaining a 950° C. temperature, for a period of time sufficient to achieve an Apparent Density (Test Method TM-7, Calgon Carbon Corporation, Pittsburgh, Pa.) of about 0.51 grams per cc for a 4×6 mesh (U.S. Standard Series sieves) particle size distribution. After gasification, the material was cooled to ambient temperature under an inert atmosphere. The nitrogen-treated carbon produced by this procedure was comparable in Apparent Density, adsorption properties, ash content, and iron content to BPL Carbon, a commercial unimpregnated vapor-phase activated carbon which is also manufactured from a bituminous coal feedstock.

The specific activity of the nitrogen-treated carbon for hydrogen sulfide removal was determined according to Test Method TM-41R (Calgon Carbon Corporation, Pittsburgh, Pa.), the sole exceptions residing in (1) the bed diameter which for this work was 22 mm instead of 19 mm and (2) the addition of at least 1% by weight of moisture to the carbon to initiate the hydrogen sulfide removal reaction. In this method a nine-inch bed of the carbon to be tested is exposed to an air stream containing 1.0 vol % of hydrogen sulfide at about 80% relative humidity under conditions of ambient temperature and pressure. The total flowrate of the gas stream is about 1450 mL per minute. The column effluent is monitored until breakthrough of hydrogen sulfide to 50 parts-per-million by volume is observed. The elapsed time required to achieve this breakthrough is called the hydrogen sulfide breakthrough time and is expressed in units of minutes. The hydrogen sulfide breakthrough capacity is then calculated by multiplying the breakthrough time by the mass flowrate of hydrogen sulfide per unit volume, in this case 0.000254 grams of hydrogen sulfide per cc-minute.

By this procedure the nitrogen-treated carbon prepared as described above displayed a hydrogen sulfide breakthrough time of 450 minutes. The corresponding hydrogen sulfide breakthrough capacity was 0.11 grams of hydrogen sulfide per cc of carbon (g $H_2S$/cc).

A sample of 4×6 mesh (U.S. Standard Series sieves) BPL Carbon (Calgon Carbon Corporation, Pittsburgh, Pa.) exposed to hydrogen sulfide under the same TM-41R conditions displayed a hydrogen sulfide breakthrough time of 75 minutes and a hydrogen sulfide breakthrough capacity of 0.02 g $H_2S$/cc. The Apparent Density of the virgin BPL Carbon was 0.50 grams per cc.

The spent nitrogen-treated carbon and the spent BPL Carbon from the above TM-41R tests were then analyzed for sulfuric acid and elemental sulfur. The sulfuric acid and elemental sulfur analyses were performed by extracting a representative sample of the spent material with deionized water in a Sohxlet apparatus and titrating an aliquot of the water extract with standard base to determine the sulfuric acid content. The extracted carbon sample was then dried at 110° C. and extracted a second time with carbon disulfide in a Sohxlet apparatus. The carbon disulfide in the extract was then evaporated and the weight of the extracted elemental sulfur was determined gravimetrically.

By this procedure the spent nitrogen-treated carbon was found to contain 215 milligrams of sulfuric acid and 79 milligrams of elemental sulfur per gram of dry carbon. The spent BPL Carbon was found to contain 7 milligrams of sulfuric acid and 19 milligrams of elemental sulfur per gram of dry carbon. Therefore, about 73% by weight of the hydrogen sulfide removal products were present as sulfuric acid on the nitrogen-treated carbon compared to only about 27% as sulfuric acid on the BPL Carbon. This demonstrates that the chemistry of hydrogen sulfide removal is strongly shifted to sulfuric acid formation on the nitrogen-treated carbon.

Example 2

Two samples of the nitrogen-treated carbon prepared as given in Example 1 were exhausted for hydrogen sulfide removal by the TM-41R test procedure as given also in Example 1. These samples displayed an average hydrogen sulfide breakthrough time of 452 minutes; the average hydrogen sulfide breakthrough capacity was 0.11 grams of $H_2S$ per cc. The samples were then water-washed in situ in a continuous process in which deionized water was passed downflow through the carbon beds at a flowrate between 150 and 300 mL per minute for 5 to 24 hours. The samples were then dried in situ with zero-grade nitrogen gas to a moisture content of about 5 to 10 wt % and re-exposed to hydrogen sulfide under the same TM-41R conditions given earlier. By this procedure the water-regenerated samples displayed an average hydrogen sulfide breakthrough time of 344 minutes and an average hydrogen sulfide breakthrough capacity of 0.09 grams per cc. The recovered hydrogen sulfide capacity was, therefore, about 80% of the virgin capacity.

While a presently preferred embodiment of the invention has been described in particularity, it may be otherwise embodied within the scope of the appended claims.

What is claimed is:

1. A process for restoring hydrogen sulfide removal capacity in nitrogen-treated carbonaceous char, said char having reduced capacity for hydrogen sulfide removal as a result of exposure to gas streams containing hydrogen sulfide, oxygen, and $H_2O$, said char prepared prior to said exposure by treatment of a carbonaceous material at temperatures above 700° C. in the presence of a nitrogen-containing compound, said process for restoring hydrogen sulfide removal capacity comprising the steps of:

(a) contacting said hydrogen sulfide, in the presence of said oxygen and $H_2O$, with said nitrogen-treated carbonaceous char, to convert said hydrogen sulfide into sulfuric acid;

(b) contacting said char, after exposure to hydrogen sulfide and conversion of said hydrogen sulfide into sulfuric acid, with water at temperatures less than 100° C.; and (c) removing the contacted water from the said char.

2. The process as set forth in claim 1 wherein steps 1b and 1c are accomplished in separate operations.

3. The process as set forth in claim 1 wherein steps 1b and 1c are accomplished in a continuous operation.

4. The process as set forth in claim 1 wherein the said water is provided by an aqueous solution.

5. The process as set forth in claim 1 wherein said nitrogen-treated carbonaceous char is prepared by:

(a) carbonizing a bituminous coal or a material having bituminous properties at temperatures less than 700° C. in the presence of an oxidizing agent;

(b) oxidizing said bituminous coal or material having bituminous properties at temperatures less than 700° C. during or after said carbonization; and (c) contacting said carbonized and oxidized bituminous coal or material having bituminous properties with a nitrogen-containing compound and, during or after said contacting, increasing the temperature to minimally 700° C.

6. The process as set for in claim 1 wherein the said nitrogen-treated carbonaceous char has been activated, prior to said exposure to hydrogen sulfide, at temperatures greater than 700° C. using at least one of $H_2O$, $CO_2$, and $O_2$.

7. The process as set forth in claim 6 wherein the activated nitrogen-treated carbonaceous char is cooled to temperatures less than 400° C. in an oxygen-free or otherwise inert atmosphere after activation at temperatures greater than 700° C.

8. The process as set forth in claim 5 including step (d) activating said nitrogen-treated carbonaceous char at temperatures greater than 700° C. using at least one of $H_2O$, $CO_2$, and $O_2$.

9. The process as set forth in claim 8 wherein the activated nitrogen-treated char is cooled to temperatures less than 400° C. in an oxygen-free or otherwise inert atmosphere after activation at temperatures greater than 700° C.

* * * * *